Nov. 6, 1923.
H. L. PITMAN
SPRING MOTOR
Filed Feb. 20, 1917
1,472,936
3 Sheets-Sheet 2
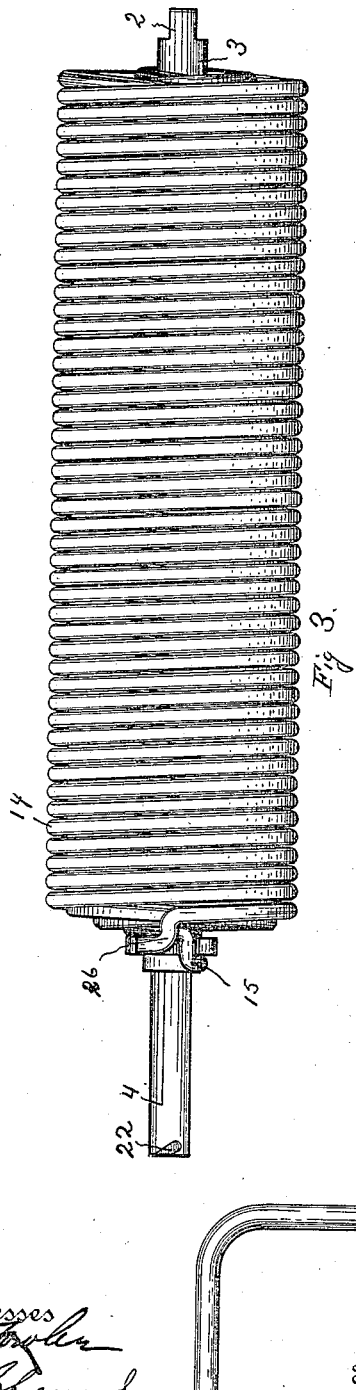
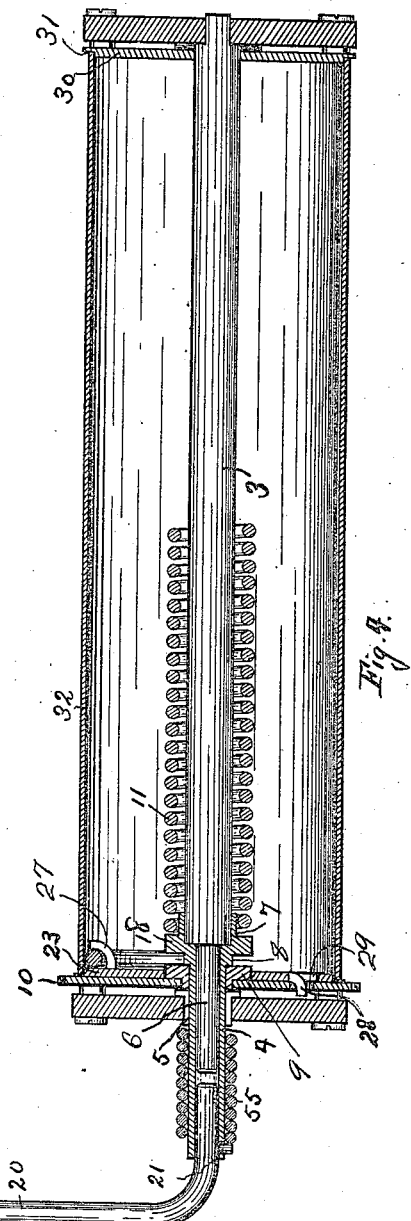

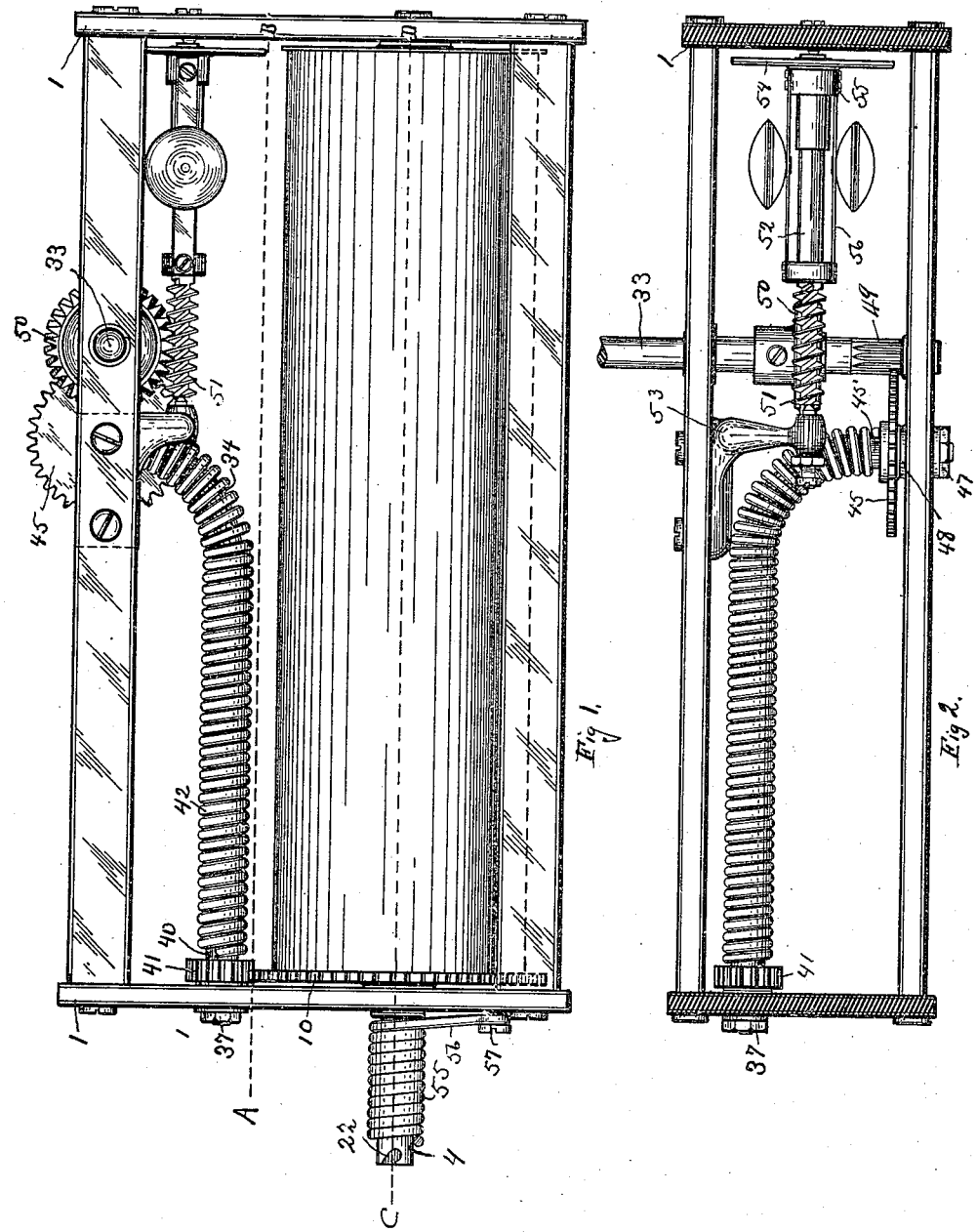

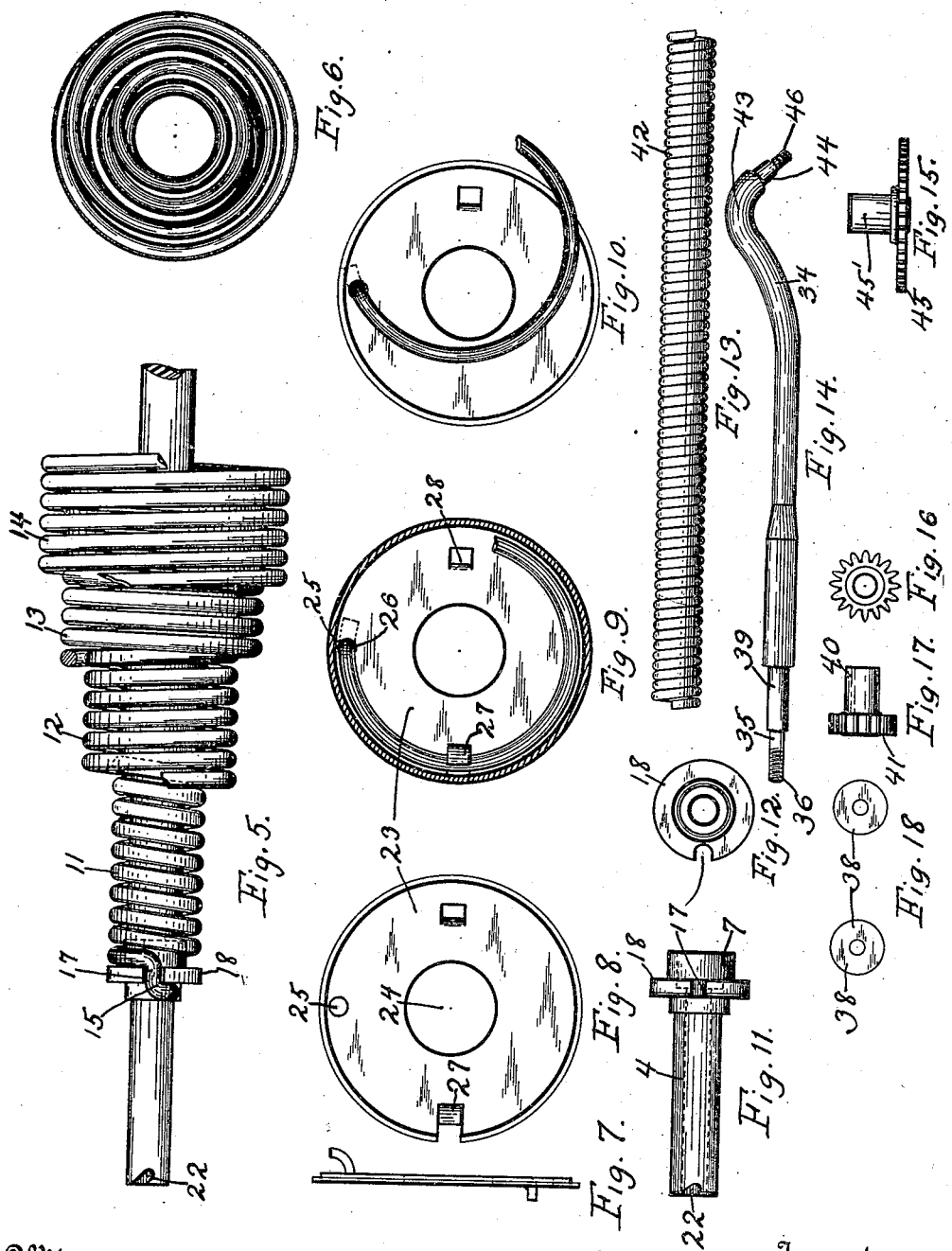

Patented Nov. 6, 1923.

1,472,936

UNITED STATES PATENT OFFICE.

HENRY L. PITMAN, OF BROOKLYN, NEW YORK.

SPRING MOTOR.

Application filed February 20, 1917. Serial No. 149,855.

*To all whom it may concern:*

Be it known that I, HENRY L. PITMAN, a citizen of the United States, residing at Brooklyn, in the county of Kings and State of New York, have invented certain new and useful Improvements in Spring Motors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in spring motors and the object in view is to produce a simple and highly efficient device of this nature so constructed as to store in a small space a considerable power and which, when utilized for operating sound reproducing machines, will afford means for playing a whole repertoire upon a single winding of the motor. This object is gained by winding a series of evenly wound concentric layers of spring to form a multiple spring coil, each layer being a helix having numerous whorls, the power exerted by the spring being nearly uniform during the main portion of the unwinding of the spring.

There is absorption of any vibration incident to irregular rotary movements of the motor that might occur, and hence a uniform rotary movement is imparted to the spindle which drives the record disk or work-holder.

Another feature is the transmission of power from the motor through a resilient shaft adapted to rotate a spindle in a plane at right angles to the axis of the main spring of the motor, tension upon the shaft serving to impart a smooth regular rotary movement to the spindle through suitable gear connections.

Another and important feature of the present invention consists in the provision in a spring motor of means for preventing the over winding of a multiple spring coil of the motor. I have devised a multiple coil spring made of a single piece of wire in which layers of coils are superimposed one upon another. I have found that the coils are apt to be overwound, due to the outer coil not being held in proper position and protected by supporting surfaces from beneath. In the absence of protective means, when the elastic limit of the wire is approached in winding or storing energy in the spring, due to the friction of the underlying coils and their more rapid rotation, the unsupported top coils are liable to be pulled in between some of the underlying coils, becoming tangled and permanently distorted.

To prevent overwinding, however, I provide a fixed shaft inside the innermost coil which is of such a diameter that the given amount of contraction of the innermost coil, when under tension, will cause it to grip the shaft and the latter not being able to rotate, further winding of the spring will be prevented. By this arrangement the amount of energy that can be applied to the spring will be limited to its capacity. The outer layer of the spring will be held or supported in its proper position by means of a protecting tube or coil mounted about it and of such a diameter that the spring must be coiled up slightly before placing in the tube.

Another and important feature of the present invention consists in the provision of the multicoiled spring motor, made preferably of round wire which is a standard article, easily secured in the open market and more readily prepared for use and coiled than either flat strips of metal or square wire, round wire being less liable to crystalize and break, due to the different methods of manufacture and hence more reliable and durable than flat strips. Heretofore, springs made of flat strips of metal have been formed and, when working under tension, the superimposed coils will bear heavily upon each other and cause considerable loss of energy by coil friction and, in the case of the well known clock springs, made of flat strips of metal, highly polished, the different coils sliding between and on each other will lose a large percentage of their power in this manner and effecting an uncoil in an abrupt, jerky, irregular way, oftentimes exerting very little pressure upon the spindle and in extreme cases, if not kept lubricated freely, will become clogged and refuse to work at all.

It is the purpose of the present invention to obviate the defects heretofore encountered in spring motors and to generally improve upon and render more efficient this type of motors and to reduce the friction to a minimum.

One of the objects of the invention is to provide means in a phonograph for maintaining the pitch of a sustained note. This has been found impossible where the record-driving motors have been in the form of flat spring coils, which are wound tightly one upon another, and have a great deal of surface constantly in contact, with the tight coils gripping and binding one upon another. Power is delivered by such springs in a jerky manner. These variations in the power produce fluctuations in the speed of the record, which necessarily cause disagreeable alterations in the pitch of a sustained note, and generally render the music off key frequently during the rendition of a selection. Moreover, only a small portion of the usual coiled flat spring is in use at any time, and this makes the spring liable to become much stronger when there is a little decrease of load, or much weaker when there is a little increase of load. Moreover, a flat spring tends to draw back when it unlimbers, thus producing friction, so that it unwinds by jerks. Besides, a flat spring has not the same temper and is not of uniform quality or strength throughout its length. Sometimes a weak portion is driving, and sometimes a strong portion. All of these are further causes for irregularities in the speed of the record and the consequent failure to maintain the pitch of a sustained note. It has been attempted to mitigate the above troubles in flat springs by the use of oil. But under the heavy pressure the oil is squeezed out from between the flat coils.

These and other difficulties are overcome, a smooth action is secured, and the pitch of a sustained note is properly maintained, by the spring herein set forth, made of a single length of round wire in the form of helical coils as aforesaid, there being no binding of one coil upon another, and the round wire whorls not being gripped between two coils as in a flat spring, and there being no liability of the spring becoming stronger when there is reduction of load, or weaker when there is an increase of load, inasmuch as the whole spring is exerting energy or driving at the same time for a length of 100 feet in some cases. There is also avoided any difficulty from some portions of the spring being stronger than others, because variations in strength in different portions have no effect, inasmuch as the entire spring is exerting energy or driving all the time.

The invention comprises, further, various details of construction, combinations and arrangements of parts which will be hereinafter fully described, shown in the accompanying drawings and then specifically defined in the appended claims.

I illustrate my invention in the accompanying drawings, in which:—

Figure 1 is a top plan view of my improved motor apparatus.

Figure 2 is a sectional view on line A—B of Figure 1.

Figure 3 is an enlarged detail view in elevation of the multiple spring coil and shaft upon which the same is mounted.

Figure 4 is a sectional view on line C—D of Figure 1.

Figure 5 is an enlarged detail in elevation through a portion of the multiple coil and shaft upon which the same is mounted.

Figure 6 is an end view of the coil.

Figure 7 is an edge view of a disk to which one end of the coil is fastened.

Figure 8 is a plan view of the disk shown in Figure 7.

Figure 9 is a sectional view through a casing of the motor showing one end of the coil anchored to the disk shown in Figure 8.

Figure 10 is a detail view of a disk with one end of the coil connected thereto.

Figure 11 is a view in elevation of a sleeve to which the operating handle is adapted to be connected and in which the spindle end of a shaft is mounted.

Figure 12 is an end view of the sleeve shown in Figure 11.

Figure 13 is a view in elevation of a flexible shaft.

Figure 14 is a detail view of a core upon which the flexible shaft is mounted.

Figure 15 is a detail view of a gear with sleeve upon which the same is mounted.

Figures 16, 17 and 18 are detail views of parts of the invention.

Reference now being had to the details of the drawings by numerals, 1 designates the frame of the apparatus in which a half milled end 2 of the shaft 3 is held from rotation, and 4 designates a sleeve, a detail of which is shown in Figure 11 of the drawings, which is journaled in a flanged thimble 5 mounted in an aperture in the frame. Said sleeve is adapted to form a bearing for the spindle end 6 of the shaft and the inner end of the sleeve is provided with a shoulder 7 and is recessed to receive the enlarged portion of the shaft 3 adjacent to said spindle 6, as shown in Figure 4 of the drawings. The circumference of the sleeve has a shoulder 8 against which a flanged collar 9 has a bearing and upon which collar a gear wheel 10 rotates.

The mechanical driving element of the apparatus comprises a multi-coil spring, a portion of which is shown in Figure 5 of the drawings, and which is made of a single piece of wire, preferably circular in cross section, the drawings showing four helical coils, designated respectively by numerals 11, 12, 13 and 14, one within another. One end of the coil 11 is bent as at 15, as shown in Figures 3 and 5 of the drawings, and engages a recess 17 formed in the flange 18 of the sleeve 4. The first convolution of the coiled spring 11 adjacent to said bent end 15 is adapted to fit over the flange 7 of the sleeve, as shown in Figure 4 of the drawings, and for an essential purpose in the effectual operation of the apparatus, while the other convolutions of the coil 11, as shown in Figure 4 of the drawings, are spaced apart a slight distance from the shaft 3 which passes through the same.

A crank 20 is shown in Figure 4 of the drawings as being provided with a pin 21 which is adapted to engage a notch 22 in the sleeve 4 and forming means whereby the sleeve may be rotated for the purpose of putting the coils under tension.

A disk, designated by numeral 23, details of which are shown in Figures 8 and 9, has a central opening 24 and is mounted about the circumference of the flange of the collar 8, as shown clearly in Figure 4 of the drawings, and said disk has a circular outlined aperture 25 adapted to receive the bent end 26 of the spring. Said disk has a lug 27 struck up therefrom and which is adapted to be engaged by the strand of the largest coil 14 and a second struck up lug 28 which is adapted to engage an aperture 29 formed in the gear wheel 10, as shown clearly in Figure 4 of the drawings. By this arrangement of connecting the spring to the disk and the disk to the gear wheel, it will be noted that a rotary movement will be imparted to the gear wheel as the spring is relieved of its tension.

A second disk, designated by numeral 30, is shown in the drawings as being mounted upon the shaft 3 and has an annular shoulder 31 about its circumference as has also the disk 23 and is adapted to receive the cylindrical casing 32, which latter, it will be noted upon reference to Figures 4 and 9 of the drawings, not only serves as a protection to the multiple coil spring but also serves to hold a strand of the largest coil 14 adjacent to its bent end in engagement with the struck up lug 27 and which will tend to hold the bent end 26 in the aperture 25 of the disk 23 when the coils are not under tension. Were it not for this means for holding the end of the large coil in the manner shown and described, trouble would be encountered incident to the springs breaking and becoming disconnected from the disk.

Referring to Figures 1 and 2 of the drawings, it will be seen that means are employed for transmitting the power from the gear wheel 10 to the spindle 33, upon which latter the disk adapted to carry the records is held. A core, designated by numeral 34, a detail of which is shown in Figure 14 of the drawings, has a contracted end 35 threaded as at 36 and which threaded portion passes through an aperture in the frame 1 and has a nut 37 mounted thereon, suitable washers 38, shown in Figure 18 of the drawings, being mounted upon the contracted end, one upon either side of the frame. Upon the shouldered portion 39 of the core 34 a sleeve 40 is journaled which has integral therewith a gear wheel 41, which is in mesh with the gear wheel 10. A flexible shaft 42 is fitted over said core and one end of the shaft engages snugly over and against the circumference of the sleeve 40 with sufficient friction to cause the flexible shaft to rotate without any slippage. One end of the core 34 has a curved part 43, adapted to change the direction of movement of the coiled spring as it rotates, it being noted that, when the parts are assembled and in operation, the motion from the motor is delivered in a plane at right angles to the length of the motor and without the objectionable use of intermeshing beveled gear wheels which would not serve to take up objectionable vibratory movements incident to the jumping or irregular rotary movements of the motor driven gear wheel 10. The core 43, near its curved end, has a shouldered portion 44 upon which the sleeve 45' is journaled and which carries a gear wheel 45, as shown clearly in Figure 2 of the drawings, and the extreme end 46 of the core adjacent to the shouldered portion 44 is contracted and threaded and adapted to receive a retaining nut 47, suitable washers 48 being mounted upon said contracted portion 46, one upon either side of the end plate. The gear wheel 45 is in mesh with the gear teeth 49 formed upon the circumference of the shaft or spindle 33. A worm gear, designated by numeral 50, is fixed to the shaft or spindle 33 and is in mesh with a worm 51 forming a part of the governor shaft 52, which latter is journaled at one end in the bracket arm 53 and its other end in the frame 1. Said governor shaft carries the disk 54, to the hub 55 of which the rotary weighted wings 56 are fastened and which is the ordinary form of governor mechanism, forming no part of the present invention.

It will be understood that the curved end of the flexible spring fits over the sleeve 45' of the gear wheel 45 with a snug fit, so that the frictional grip intermediate the contact parts will be sufficient to cause the gear wheel 45 to rotate under normal load.

The means for holding the sleeve 4 from reverse movement is accomplished through the medium of the coiled spring 55, thus dispensing with the usual pawl and ratchet wheel, and which spring has one end 56 fastened to the screw 57. It will be understood that the normal tension of the coil 55 against the circumference of the sleeve 4 will be sufficient to prevent the latter from a reverse rotary movement and that, when the handle is turned to the right, the spring tension of the coil will be relieved from the sleeve and will permit the latter to be rotated freely and that, when pressure is relieved from the handle, the coil 55 will grip and hold the sleeve securely.

The operation of my invention will be readily understood and is as follows: During the initial rotary movement which is imparted to the sleeve 4 through the medium of the crank 20, the first convolution of the coil 11 (the adjacent end of the coil 11 being in engagement with the notch 17) will grip the circumference of the sleeve 7 and, upon further rotary movement of the sleeve, the several coils will be put under tension simultaneously, it being understood that the multiple coil member is made of a single piece of wire. The other end of the wire of which the coils are composed, it will be noted, is anchored to the disk 23 which in turn is secured to the gear wheel 10 through the medium of the struck up lug 28 which passes through an aperture in the gear wheel. The winding up of the motor may continue until the coils have reached their maximum tension limit and, when the coils commence to expand, any irregular movements which may be imparted to the gear wheel 10, which is driven by the motor and which may sometimes have a jumping or jerky action, caused by friction and defective parts, will be taken up by the flexible shaft so that a comparatively uniform and smooth rotary movement will be imparted to the shaft 33.

After the motor has been wound up and the multiple coil reaches its tensional limit and commences to expand, the pressure upon the flexible shaft will cause the same to be constricted slightly at the point opposite the reduced portion of the core, shown in Figure 14 of the drawings, which is caused by the increased tension that comes upon the flexible shaft near the point of its frictional engagement with the sleeve 40; and, by this provision of reserving the extra pressure upon the flexible shaft, means is preferably provided to compensate for any jumping of the motor or irregular movements which may be imparted to the gear wheel 10 and thereby favor a uniform and steady rotary movement being imparted to the driven spindle 33 which is adapted to carry the disk upon which the record is held.

It will be noted that the ends of the flexible shaft grip the sleeves 40 and 45' with sufficient frictional force to cause movement to be imparted from the gear wheel 41 to the gear wheel 45 without any other fastening means.

By the provision of the coiled spring 55, one end of which is fastened to the frame through the medium of the screw 57 and which spring 55 normally grips the sleeve 4 with sufficient frictional force to hold the same from reverse movement, said spring 55 will, when the crank is turned, yield sufficiently to permit the sleeve to be rotated without interference in the act of putting the multiple coils under tension.

What I claim to be new is:—

1. A spring motor for talking machines, comprising a series of concentric layers of spring forming a multiple coil made up of a single piece of resilient round wire, a rotatable member to which one end of said resilient wire is connected, a driving member to which its other end is connected, a spindle adapted to carry a record disk, and a flexible shaft connected to said spindle, movement-multiplying gear connections being provided between the spindle and driving member.

2. A spring motor for talking machines, comprising a series of concentric layers of spring forming a multiple coil made up of a single piece of resilient round wire, a winding member to which one end of the wire is connected, a gear wheel to which the other end of the wire is connected, a record-driving spindle rotating at an angle to the axis of said multiple coil, a gear wheel adapted to rotate said spindle, and a flexible shaft connecting said gear wheels to cause the spindle to have a steady rotary movement.

3. A spring motor for talking machines, comprising a series of concentric layers of spring forming a multiple coil made up of a single piece of resilient round wire, a winding member to which one end of the wire is connected, a gear wheel to which the other end of the wire is connected, a rotatable record-driving spindle, a flexible shaft, and sleeved gears frictionally engaged by the ends of said flexible shaft, one of said gears being in mesh with the coil driven gear and the other geared to the spindle.

4. A spring motor for talking machines, comprising a series of concentric layers of spring forming a multiple coil made up of a single piece of resilient round wire, a winding member to which one end of the wire is connected, a gear wheel to which the other end of the wire is connected, a rotatable record-driving spindle, a flexible shaft, sleeved gears frictionally engaged by the ends of said flexible shaft, one of said gears being in mesh with the coil driven gear and the other geared to the spindle, and governor means for regulating the speed of the spindle.

5. A spring motor for talking machines, comprising a series of concentric layers of spring forming a multiple coil made of a single piece of resilient round wire, a rotatable sleeve to which one end of the wire is connected, a gear wheel to which the other end of the wire is connected, a rotatable record driving spindle having gear teeth thereon, a flexible shaft, sleeved gears frictionally engaged by the ends of said flexible shaft, one of said gears being in mesh with the coil driven gear and the other engaging the gear teeth upon said spindle, a worm gear rotating with the spindle, and a governor having a worm shaft in mesh with said worm wheel.

6. A spring motor for talking machines, comprising a frame, a sleeve journaled therein, a stationary shaft having one end engaging the frame and its other end engaging said sleeve, a series of concentrically formed layers of spring made of a single piece of resilient round wire, one convolution of the innermost of the coils mounted about said sleeve and fastened to the latter, a gear wheel mounted in a bearing upon said sleeve and connected to the outermost coil, a rotatable record-driving spindle, a flexible shaft, and sleeved gears frictionally engaged by the ends of the flexible shaft, one of said sleeved gears being in mesh with the coil-engaging gear and the other geared to the spindle.

7. The combination of a revoluble workholder, a driving-spring therefor, spring-winding means, and a train of movement-multiplying gearing connecting said spring to said work-holder, said spring being formed of a single length of round wire comprising an outermost helical coil, an innermost helical coil, and intervening helical coils, one enclosing another, each coil consisting of numerous whorls and all the coils being evenly wound, to form a compact spring to impart a large number of revolutions to said train at a single unwinding of said spring, and to enable the power exerted by said spring upon said train to be rendered nearly uniform during the main portion of the unwinding of the spring.

8. Means for maintaining the pitch of a sustained note, for use in a phonograph, comprising a coiled spring of great length to secure the required evenness of driving torque, the coils of said spring being free of binding by one another, and all portions of said spring constantly expanding throughout the unwinding of the spring, so that both strong and weak portions of the spring always are driving simultaneously, said spring formed of a single length of round wire comprising an outermost helical coil, an innermost helical coil, and intervening helical coils one enclosing another, each of said intervening coils merging at one end into one coil and at the other end into another coil, one end of said spring being connected to a winding device, a phonograph record-carrier, and movement-multiplying means connecting the other end of said spring to said record-carrier.

9. Means for maintaining the pitch of a sustained note, for use in a phonograph, comprising a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring being formed of a single length of round wire and comprising an innermost helical coil, a second helical coil wound evenly back around the innermost coil, and a third helical coil wound evenly forward around the second coil, a record-carrier, and movement-multiplying means connecting said spring to said record-carrier.

10. Means for maintaining the pitch of a sustained note, for use in a phonograph, comprising a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring being formed of a single length of round wire and comprising an innermost helical coil, a second helical coil wound evenly back around the innermost coil, a third helical coil wound evenly forward around the second coil, and a fourth helical coil wound evenly back over the third coil, a record-carrier, and movement-multiplying means connecting said spring to said record-carrier.

11. Means for maintaining the pitch of a sustained note, for use in a phonograph, comprising a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring being formed of a single length of round wire and comprising a plurality of helical coils of round wire wound one over the other, a support for the outer coil to prevent it from entangling with an inner coil; said support surrounding said outer coil and contiguous thereto, a record-carrier, and movement-multiplying means connecting said spring to said record-carrier.

12. In combination, a spring comprising a plurality of helical coils of round wire wound one over the other, and a support for the outer coil to prevent it from entangling with an inner coil; said support surrounding said outer coil, the dimension of said enclosing support being so constricted that the spring must be coiled up slightly from normal expanded condition in order to permit it to be inserted within the support.

13. Means for maintaining the pitch of a sustained note, for use in a phonograph, comprising a coiled spring of great length to secure the required evenness of driving torque, the coils of said spring being free of binding by one another, and all portions of said spring constantly expanding throughout the unwinding of the spring, so that both strong and weak portions of the spring always are driving simultaneously, said spring comprising a plurality of helical coils of round wire wound one over the other, a support for the outer coil to prevent it from entangling with an inner coil; said support enclosing or surrounding said outer coil, the dimension of said enclosing support being such that the spring must be coiled up slightly before placing it within the support, means independent of said spring for mounting said support, a record-carrier, and movement-multiplying means connecting said spring to said record-carrier.

14. Means for maintaining the pitch of a sustained note, for use in a phonograph, comprising a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring comprising a single length of round wire and formed with an outer helical winding, an inner helical winding and intervening helical windings, a support for said outer helical winding, to prevent entanglement with the intervening windings, said support comprising a device to enclose the spring, an interior support for said inner helical winding, a record-carrier, and movement-multiplying means connecting said spring to said record-carrier.

15. Means for maintaining the pitch of a sustained note, for use in a phonograph, comprising a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring comprising a single length of round wire and formed with an outer helical winding, an inner helical winding and intervening helical windings, a revoluble support for said outer helical winding, to prevent entanglement with the intervening windings, said support comprising a device to enclose the spring, means upon which said support is mounted, means to wind the spring at one end, to deliver power at the other end, a record-carrier, and movement-multiplying means connecting said spring to said record-carrier.

16. Means for maintaining the pitch of a sustained note, for use in a phonograph, comprising a central shaft, a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring being formed of a single length of round wire and comprising a central helical coil wound around said shaft, an outer helical coil, and an intervening helical coil, a revoluble casing enclosing said outer helical coil, means to wind said spring at said central coil, to deliver power at said outer coil, a record-carrier, and movement-multiplying means connecting said spring to said record-carrier.

17. In combination, a central shaft, a record-holder and a driving spring therefor formed of a single length of round wire and comprising a central helical coil wound around said shaft, a power-delivering outer helical coil, and an intervening helical coil, a casing enclosing said outer helical coil, means for mounting said casing concentrically with said shaft, spring-winding means associated with said central shaft, and means co-operating with said shaft and said central coil to prevent overwinding.

18. Means for maintaining the pitch of a sustained note, for use in a phonograph, comprising a central winding shaft, a coiled spring of great length to secure the required evenness of driving torque, the coils of said spring being free of binding on one another, and all portions of said spring constantly expanding throughout the unwinding of the spring, so that both strong and weak portions of the spring always are driving simultaneously, said spring being formed of a single length of round wire and comprising a central helical coil wound around said shaft, an outer power-delivering helical coil, and an intervening helical coil, a revoluble casing enclosing said outer helical coil, and so constricted in diameter that said spring must be coiled up slightly from normal expanded condition before placing it in said casing, a record-carrier, and movement-multiplying means connecting said spring to said record-carrier.

19. In a talking machine, in combination, a spring comprising a single length of round wire and formed with an outer helical winding, an inner helical winding, and intervening helical windings, a record-turning shaft, movement-multiplying gearing connecting said spring to said shaft, a winding crank for said spring, and means dependent upon internal constriction in said spring during the tensioning operation thereof, for locking said winding crank against movement.

20. In a talking machine, in combination, a spring comprising a single length of round wire and formed with an outer helical winding, an inner helical winding, and intervening helical windings, a record-turning shaft, movement-multiplying gearing connecting said spring to said shaft, a winding crank for said spring, and a crank lock including a member within the inner coil to be gripped thereby as the diameter of the coil lessens during the tensioning thereof.

21. In a talking machine, in combination, a spring comprising a single length of round wire and formed with an outer helical winding, an inner helical winding, and intervening helical windings, a record-turning shaft, movement-multiplying gearing connecting said spring to said shaft, a winding crank for said spring, said winding crank connected to one end of said spring, and said movement-multiplying gearing connected to the other end of said spring, and means for automatically co-operating with said spring to be effective at a predetermined point in the tensioning thereof, for locking said crank against rotation.

In testimony whereof I hereunto affix my signature in presence of two witnesses.

HENRY L. PITMAN.

Witnesses:
ARTHUR FALK,
ARTHUR E. HOWELL.